(12) United States Patent  
Fu

(10) Patent No.: US 7,108,389 B1  
(45) Date of Patent: Sep. 19, 2006

(54) FLASHING LIGHT DRIVER

(76) Inventor: Li Fu, 8 Marina Crescent, Gymea Bay, New South Wales, 2227 (AU)

( * ) Notice: Subject to any disclaimer, the term of this patent is extended or adjusted under 35 U.S.C. 154(b) by 49 days.

(21) Appl. No.: 11/088,774

(22) Filed: Mar. 25, 2005

(51) Int. Cl.
*F21V 33/00* (2006.01)

(52) U.S. Cl. .................. 362/103; 362/276; 362/802
(58) Field of Classification Search ............. None
See application file for complete search history.

(56) References Cited

U.S. PATENT DOCUMENTS 6,280,045 B1 * 8/2001 Anteby et al. ............... 362/103
6,900,735 B1 * 5/2005 Guerrieri et al. ........ 340/815.4

* cited by examiner

*Primary Examiner*—David Vu

(74) *Attorney, Agent, or Firm*—Molins & Co

(57) ABSTRACT

A shoe, soap or other article incorporates an integrated circuit having a first and a second input gate, and one or more outputs that can serve to supply power to a like number of light sources, like LEDs. The first input gate is responsive to a motion signal and acts to cause the integrated circuit to deliver a pattern of power signals to the one or more outputs. The second input gate is responsive to a second motion signal, the second motion signal actually being two or more motion signals occurring at a pre-determined frequency that the integrated circuit detects. The second input gate logically acts to cause the integrated circuit to alternate between a sleep mode and an active mode. The first input gate is disabled by the integrated circuit when the integrated circuit is in sleep mode.

16 Claims, 2 Drawing Sheets

FLASHING LIGHT DRIVER

FIELD OF THE INVENTION

The invention pertains to flashing light drivers and more particularly to a driver for one or more LED's.

BACKGROUND OF THE INVENTION

Low cost, reliable LED's are commonly used as sources of illumination in objects such as fishing lures, soaps, shoes and other practical and novelty items. In order to keep the above referenced units inexpensive and lightweight, small batteries are used. For this reason, it is desirable to extend the shelf life and the useful life of such products by switching the LED's off when they are not in use. However, it is not always practical or possible to incorporate a conventional switch such as a toggle switch or a push-button switch. Prior art devices have utilised motion sensing or acceleration sensing switches such as mercury switches, spring and post switches, post and ring switches, accelerometers and the like. However, and particularly during shipping, such switches may be inadvertently activated causing the batteries to run down and thus reduce the life of the products.

OBJECTS AND SUMMARY OF THE INVENTION

It is an object of the invention to provide a driver for one or more light sources such as LED's. The driver is in the form of an integrated circuit having inputs for one or more triggers. The integrated circuit also has one or more outputs that supply power to an LED or an LED array. The integrated circuit is programmed to respond to a first predetermined sequence of input signals from one trigger. This first pre-determined initiation sequence enables the driver to operate and a second predetermined sequence causes the driver to stop functioning until third sequence is detected. The second and third sequences may be identical.

In preferred embodiments a first trigger initiates the activation of the integrated circuit. Upon activation, the first trigger is disabled and further signals from the first trigger will not initiate a subsequent initiation until the integrated circuit is disabled by the second pre-determined sequence.

In preferred embodiments, the device is incorporated into an object such as a shoe, soap or lure.

BRIEF DESCRIPTION OF THE DRAWING FIGURES

BEST MODE AND OTHER EMBODIMENTS OF THE INVENTION

A motion or acceleration sensing switch may be selected from a wide family of switches such as mercury switches, spring switches, pendulum switches etc. A typical spring switch comprises two contacts one of which is a spring. Sufficient motion or acceleration causes the spring to deflect and thus close an electrical circuit with the other contact. The contact may be internal or external to the spring. The aforementioned broad family of switches is well known and the invention may employ any type of motion sensing switch to advantage. Thus, the term "motion sensing switch" or trigger is deemed to incorporate this broad family as well as its equivalents. It will also be appreciated that in place of motion sensors, the invention's teachings regarding "Sleep Mode" and "Active Mode" may be beneficial when other types of sensors such as sound or light sensors are used in place of or with motion sensors.

Figure 1:
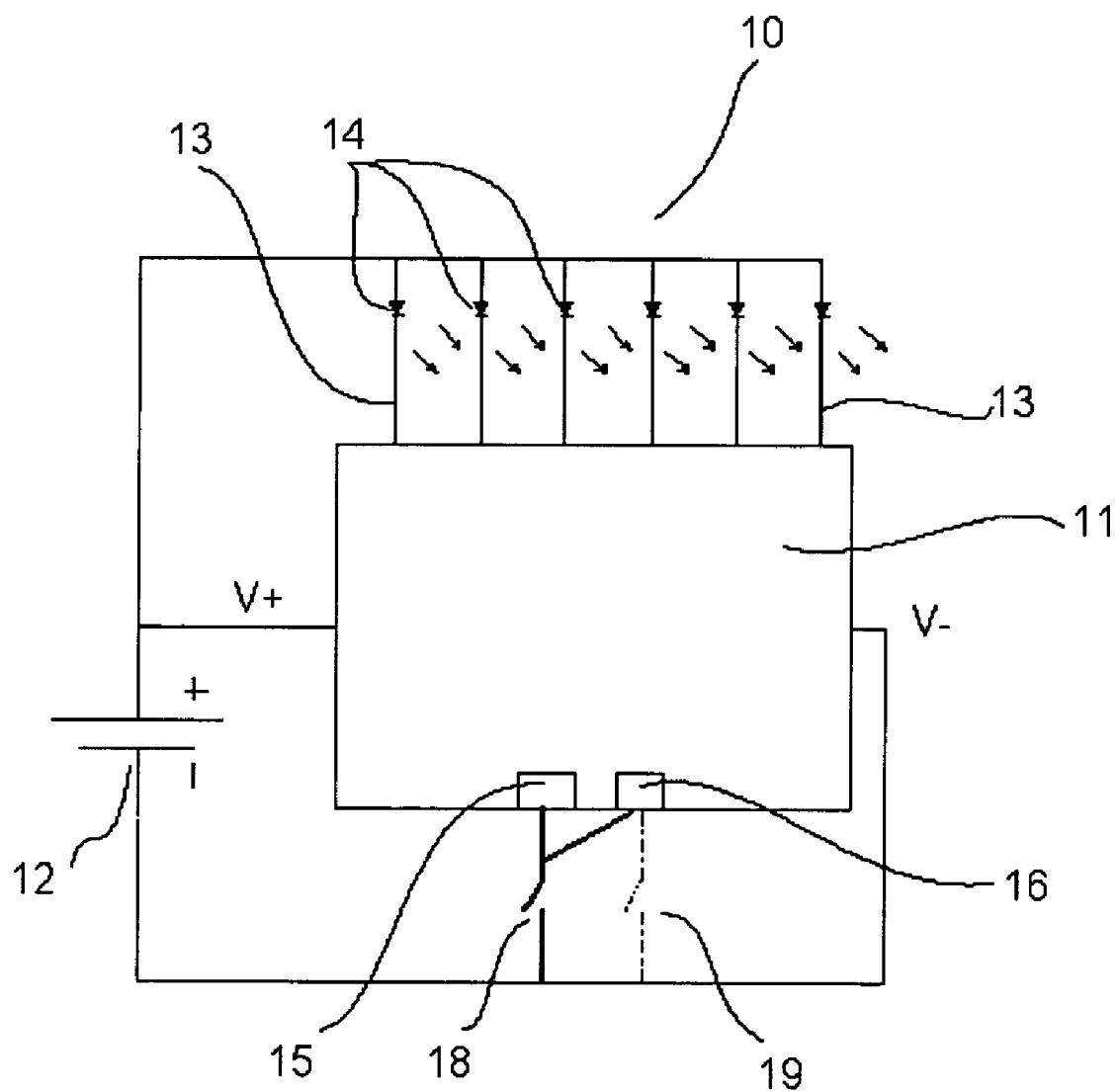
FIG. 1 is a schematic diagram illustrating a module comprising the integrated circuit, trigger inputs, voltage inputs and LED's that are triggered by the integrated circuit outputs.

As shown in FIG. 1, a flashing light driver assembly 10 comprises and integrated circuit ("IC") 11 that is powered by a battery 12. The integrated circuit has one or more outputs 13 that may be used to power light sources such as LED's that form an array 14. When the LED's are incorporated in a single package with the aforementioned IC and battery assembly, it is referred to as a "module".

The IC there has several entry points or logic gates for receiving or detecting signals that are generated by the aforementioned motion or acceleration sensing switches. A motion switch delivers a "motion signal" whenever it is moved or accelerated past a particular threshold. In the present invention the gates 15, 16 of the IC process these motion signals in different ways.

FIG. 1 illustrates the use of two input or logic type gates 15 and 16. Each input gate 15, 16 has a different function and processes input or motion signals in different ways. Both gates may take motion signals from the same motion sensor 18. In the alternative, a second sensor, such as a motion sensor 19 may be used so that each gate 15, 16 is signalled by a separate sensor, even a different type of sensor.

In this example, the first gate 15 has a motion signal as an input and the gate 15 is used to "drive" or switch on the LED array 14. When the first gate 15 receives a first motion signal or a first pre-determined motion signal sequence it will trigger a circuit component of the IC 11 that will activate a predetermined pattern of power signals to the LED array 14. While this predetermined pattern of power signals is running, the first gate 15 will ignore further motion input signals until the pattern is finished. When the pattern is finished, the first gate will respond to motion signals and generate trigger signals.

The second gate 16 has a separate function that is related to the on/off status of the IC itself. The second gate 16 will receive a second signal, this being in preferred embodiments a second signal sequence, comprising a number of consecutive motion signals ("the count") generated by a motion or acceleration sensor. The second sequence is said to have a frequency that is defined as, for example, the count divided by the time over which the count occurs (as determined by the IC). If the second signal sequence is at or above a predetermined frequency, and of the correct count, the second gate 16 will turn off the first gate 15 and put the IC into "Sleep Mode". If the second signal or signal sequence is not at the correct frequency or within the correct frequency range, or count, the second gate 16 will ignore the signals. While in Sleep Mode, the first gate 15 will ignore any subsequent signals from the corresponding motion sensing switch. However, if the second gate 16 then receives a subsequent series of motion signals at the correct predetermined or pre-programmed frequency and count then it will generate an activation signal and turn the first gate 15 back on. This activation signal switches the first gate 15 back to Active Mode from Sleep Mode.

Thus, in Active Mode the IC, and hence the LED array, is quiescent until it receives the trigger signal from the first gate 15, as discussed above. Upon receipt of the trigger signal from the first gate 15 the IC will initiate and activate the predetermined pattern in accordance with the IC program and LED array. During the pattern, the first gate 15 is disabled and another motion signal from the switch through the first gate 15 will not initiate a subsequent pattern until the completion of a preceding pattern. A correct frequency and count from the motion switch associated with the second gate 16 sends the IC into Sleep Mode. During Sleep Mode the first gate 15 is disabled. Only a subsequent motion signal sequence to the second gate at the predetermined frequency and count can cause the second gate 16 to send an activation signal to the IC and switch the IC to Active Mode.

The first gate 15 and its motion switch are used primarily during the product testing and packaging that occurs prior to shipment from a factory. When the assembly 10 is manufactured and the batteries 12 are installed, the integrated circuit is quiescent until it receives the triggering signal from the first gate 15. This trigger signal is detected by the IC 11, whereupon it initiates a pre-determined sequence or cycle of power signals that causes the one or more LED's 14 to illuminate according to the pattern that is programmed into the integrated circuit 11. The pattern might include a sequence of flashes either in unison or in a pre-determined order. There is practically no limitation in the type of pattern that can be employed to illuminate the one or more LED's 14.

This initial pattern of LED illumination is terminated when a second pre-determined sequence is detected from the second gate 16. In preferred embodiments, the second sequence is more complex than the first sequence and therefore less likely to occur during random motion that may occur during shipping. The second sequence 16 may be characterised by the requirement for multiple motion events or a pre-established interval between two or more motion events in order to reduce the likelihood of inadvertent activation.

Figure 2:
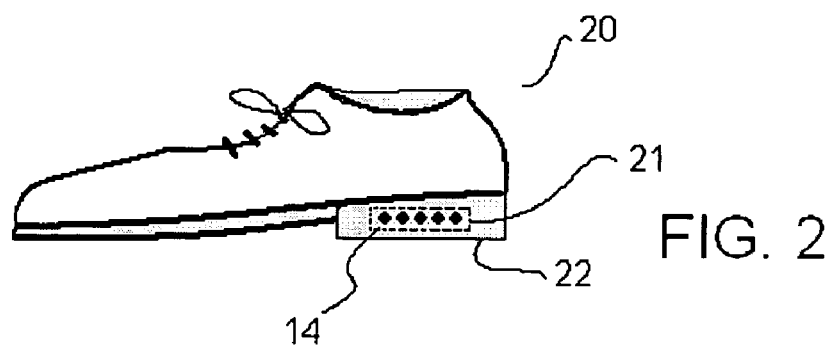
FIG. 2 is a side elevation of a shoe incorporating a driver and LED incorporated into the heel.

As shown in FIG. 2, a shoe 20 is manufactured by inserting or embedding a flashing light driver module 21 into the heel 22. In this embodiment, the module comprises an integrated package that is fully concealed by the heel 22 except for the visible LED array. As previously suggested, one way of utilising the module 10 is to first embed it in the heel 22 then activate it by moving or otherwise jolting the shoe so as to cause the first gate 15 to send the trigger signal to the IC. This will cause the display pattern to be emitted by the LED's 14. Thereafter, the pattern is terminated when the second gate 16 detects the second sequence whereupon the unit is in Sleep Mode ready for shipment. The end user initiates the LED pattern display by generating a motion that causes the motion sensor to generate the correct count and frequency (generally, the second sequence) then generating a motion that causes the first gate 15 to send the trigger signal to the IC.

Figure 3:
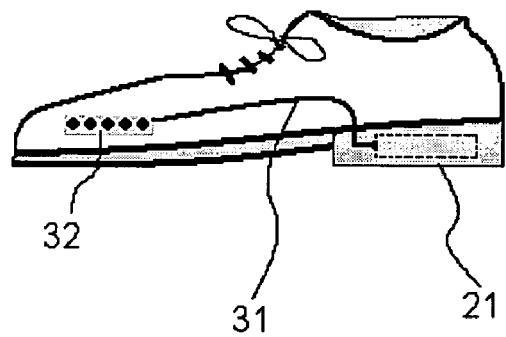
FIG. 3 is a further embodiment illustrating the use of a wiring harness between the driver assembly and the LED array.

As shown in FIG. 3, a further embodiment utilises a wiring harness 31 between the module 21 and a separate LED array 32. Utilising a harness 31, the array 32 can be located remotely from the module 21. The type of arrangement depicted in FIGS. 2 and 3 is not limited to shoes.

Figure 4:
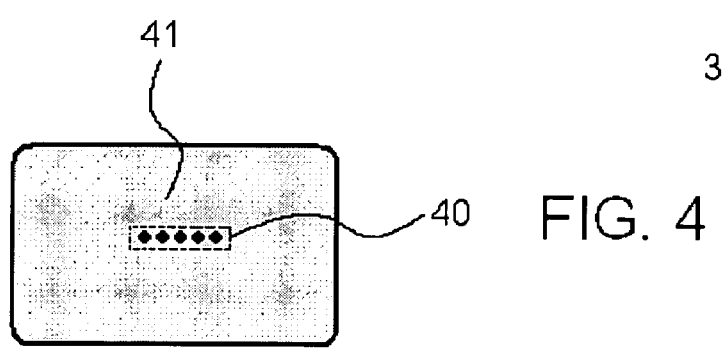
FIG. 4 is a plan view of a soap incorporating an LED driver module and LED array.

A further embodiment of the invention is depicted in FIG. 4. In this embodiment, a driver assembly 40 is embedded in a bar of soap 41. Where the soap is transparent or translucent, the LED array 41 can be completely encapsulated by the soap.

While the present invention has been disclosed with reference to particular examples and details of construction, these should be understood as having been provided by way of example and not as limitations to the scope or spirit of the invention.

What is claimed is:

1. An integrated circuit for a driver for a flashing light display comprising:
   an integrated circuit having a first and a second input gate and one or more outputs that can serve to supply power to a number of light sources;
   the first input gate being responsive to a first trigger signal and acting to cause the integrated circuit to deliver a pattern of power signals to the one or more outputs;
   the second input gate being responsive to a second trigger signal, the second trigger signal being two or more motion signals occurring at a pre-determined frequency;
   the second input gate acting to cause the integrated circuit to alternate between a sleep mode and an active mode upon each occurrence of the second trigger signal;
   the first input gate being disabled by the integrated circuit when the integrated circuit is in sleep mode.

2. The integrated circuit of claim 1, wherein:
   the pattern delivered by the integrated circuit to the one or more outputs comprises a flashing pattern.

3. The integrated circuit of claim 2, wherein:
   there are two or more outputs.

4. A driver for a flashing light display comprising:
   an integrated circuit having a first and a second input gate and one or more outputs that can serve to supply power to a number of light sources;
   the first input gate being responsive to a first trigger signal and acting to cause the integrated circuit to deliver a pattern of power signals to the one or more outputs;
   the second input gate being responsive to a second trigger signal, the second trigger signal being two or more motion signals occurring at a pre-determined frequency that the integrated circuit detects;
   the second input gate acting to cause the integrated circuit to alternate between a sleep mode and an active mode;
   the first input gate being ignored by the integrated circuit when the integrated circuit is in sleep mode; and
   a first motion sensor delivering a first motion signal to the first gate.

5. The driver of claim 4, wherein:
   the first motion sensor delivers a second motion signal to the second gate.

6. The driver of claim 4, wherein:
   each output of the integrated circuit is associated with an LED that it supplies power to.

7. The driver of claim 4, wherein:
   a second motion sensor sends the second trigger signal to the second gate.

8. The driver of claim 4, wherein:
   the second signal comprises a number of motion signals that will cause the alternation between sleep mode and active mode in the integrated circuit, only if the number of motion signals occurs at a frequency that the integrated circuit has been constructed to respond to.

9. The driver of claim 8, wherein:

the number of motion signals must occur as a pre-determined minimum number of signals occurring in a period of time that the integrated circuit has been constructed to respond to.

10. A device with a flashing light display comprising:

a device into which is incorporated an integrated circuit having a first and a second input gate, and one or more outputs that can serve to supply power to a number of light sources;

the first input gate being responsive to a first trigger signal and acting to cause the integrated circuit to deliver a pattern of power signals to the one or more outputs;

the second input gate being responsive to a second trigger signal, the second trigger signal being two or more motion signals occurring at a pre-determined frequency that the integrated circuit detects;

the second input gate logically acting to cause the integrated circuit to alternate between a sleep mode and an active mode after each occurrence of the second trigger signal;

the first input gate being disabled by the integrated circuit when the integrated circuit is in sleep mode; and a first motion sensor delivering a first trigger signal to the first gate.

11. The device of claim 10, wherein:

the device is a shoe further comprising one or more external LEDs that are driven by the pattern of power signals.

12. The shoe of claim 11, wherein:

a first motion sensor delivering a second trigger signal to the second gate.

13. The shoe of claim 11, further comprising:

a battery for powering the integrated circuit and the one or more external LEDs.

14. The shoe of claim 11, wherein:

the second trigger signal comprises a number of motion signals that must occur as a pre-determined minimum number of signals occurring in a period of time that the integrated circuit has been constructed to respond to.

15. The shoe of claim 11, wherein:

the second gate is responsive only to the second trigger signal.

16. The device of claim 10, wherein:

the device is a soap.

* * * * *